March 28, 1961    H. W. SCHNEIDER    2,977,448
CORD OR CHAIN OPERATED PULL SWITCHES
Filed Nov. 19, 1959    2 Sheets-Sheet 1

INVENTOR
Hans Wernhard Schneider
BY
Michael S. Striker
ATTORNEY

March 28, 1961 H. W. SCHNEIDER 2,977,448
CORD OR CHAIN OPERATED PULL SWITCHES
Filed Nov. 19, 1959 2 Sheets-Sheet 2
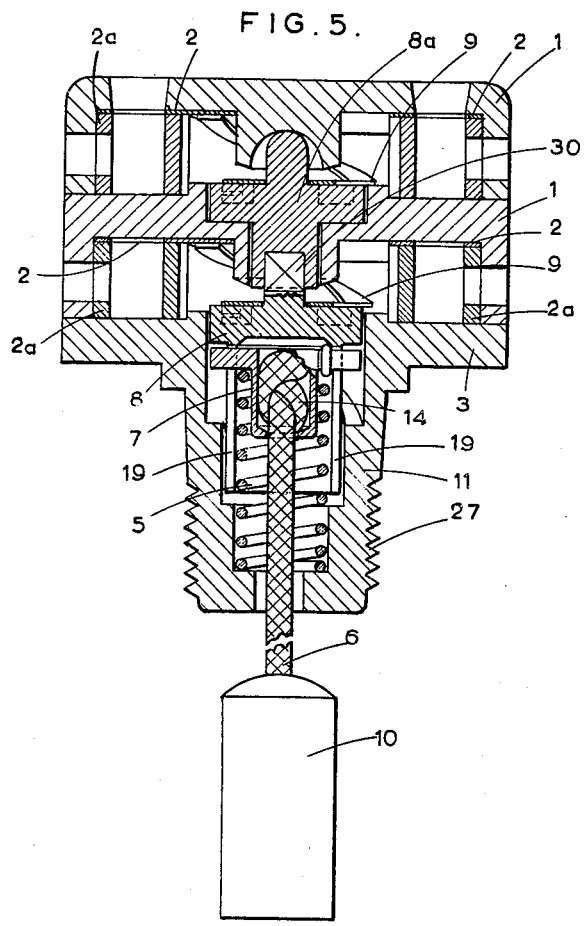
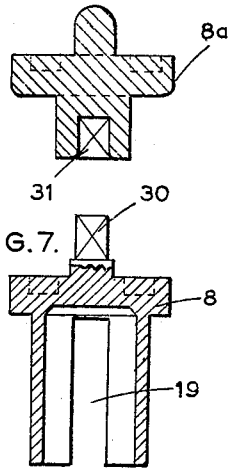
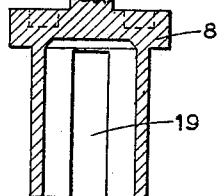
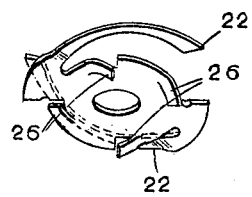
INVENTOR
Hans Wernhard Schneider
BY
Michael S. Striker
ATTORNEY United States Patent Office 2,977,448
Patented Mar. 28, 1961

2,977,448

CORD OR CHAIN OPERATED PULL SWITCHES

Hans Wernhard Schneider, Castle Works, High St., Old Woking, England

Filed Nov. 19, 1959, Ser. No. 854,091

Claims priority, application Great Britain Nov. 26, 1958

5 Claims. (Cl. 200—161)

This invention relates to cord or chain operated pull switches generally, whether they are of the type in which the circuit is made and broken alternately by succeeding pulls on the cord or chain, or whether a pull on the cord or chain completes the circuit, the circuit being broken by means of a spring on the tension in the cord or chain being relaxed. Such switches which form the subject of the present invention are intended to be mounted in position upon a ceiling or other horizontal surface so that the cord or chain depends downwardly. The former type of switch is particularly suitable for use as a lighting switch or as a starter switch in connection with fluorescent lighting units. The second type of switch with which the invention is concerned is more suitable for electric bell operation or for other uses where only a momentary completion of the electric circuit is required. An example of the first mentioned type of switch forms the subject of my prior Patent No. 644,265, but this prior construction although a switch of the rotary type, was intended for mounting on a vertical surface such as a wall or other vertically positioned support.

The invention is equally applicable to switches of the single or multi-pole type.

The chief object of the invention is to evolve an electric pull switch of the cord or chain operated type which is suitable for mounting on a ceiling or other horizontal surface so that the cord or chain depends downwardly, which will involve the use of a minimum number of component parts and which furthermore will be of small dimensions.

An electric switch of the cord or chain operated type in accordance with the present invention includes a hollow base containing fixed contacts, a moving contact member mounted for rotational or part rotational movement, and a moving contact operating member having a helical path of movement under the pull of the cord or chain about an axis lying concentric with the axis of rotation of the moving contact member and the longitudinal axis of the cord or chain.

The moving contact operating member preferably engages helically arranged faces of opposite pitch formed within a tubular extension of a cover plate, which serves to close the hollow base containing the fixed contacts and moving contact member and acts on the moving contact through the medium of a driving member composed of insulating material, which member is rotated or partly rotated by the moving contact operating member, but is prevented from moving linearly therewith.

In the case of the second type of switch with which the invention is concerned, the moving contact member may be carried by the insulated driving member so that as a result of part rotational movement of the driving member the moving contacts will engage or disengage the fixed contacts to momentarily make or break the electrical circuit.

In the case of the first type of switch, however, with which the invention is primarily concerned, the driving member is formed with a series of projections which are radially positioned on its upper extremity, which projections engage inclined ratchet arms on the moving contact member to impart to the latter a uni-directional driving movement through a determined angle each time the cord or chain is pulled, the projections overriding the inclined ratchet arms during return movement of the driving member to its initial position under the action of an associated spring and upon the tension in the cord or chain being released to leave the moving contact member in its making or breaking position. Consequently the moving contact member will be given a step by step uni-directional rotary movement as a result of successive pulls on the operating cord or chain.

Referring to the accompanying drawings:

Figure 5 is a vertical section of a double pole switch in accordrance with the invention.

Figures 6–9 are detail views of the main internal components of the switch shown in Figure 5.

Figure 1:
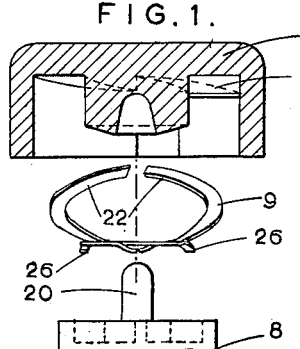
Figure 1 is an exploded view of a cord operated single pole electric pull switch in accordance with the invention.
Figure 2:
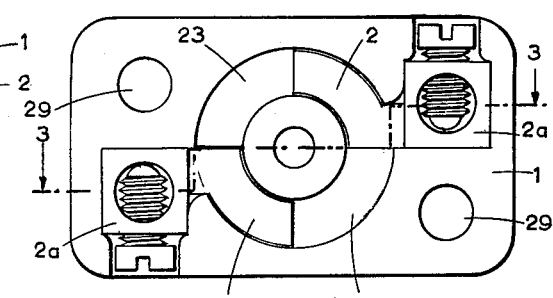
Figure 2 is a plan view of the switch base looking in the direction of arrows 2—2 in Figure 3 and showing the fixed contacts and terminates in position therein.
Figure 3:
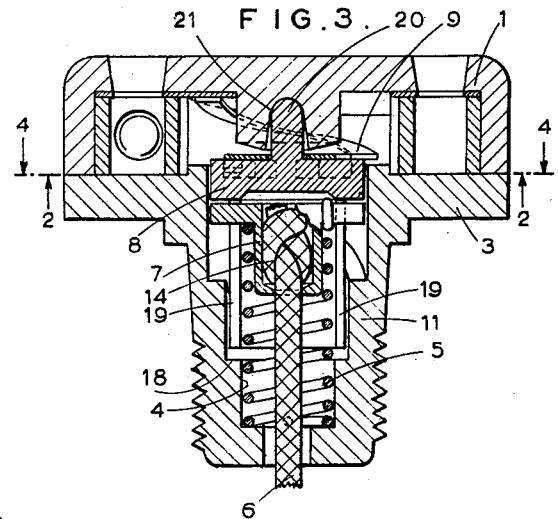
Figure 3 is a section on the line 3—3 in Figure 2 but showing the remainder of the switch parts in position.
Figure 4:
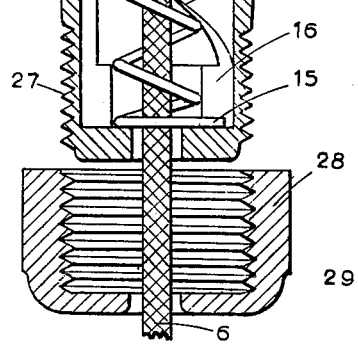
Figure 4 is a view of the cover plate and its contained parts looking in the direction of the arrows 4—4 in Figure 3.
Figure 4:
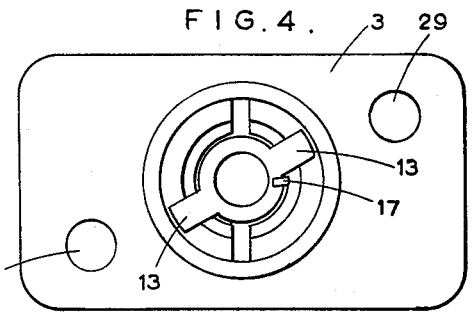

In a preferred embodiment of the invention as applied to an electric switch of the alternate make and break type, as shown in Figures 1-4, the switch comprises a body or base 1 which contains two pressed metal fixed contacts 2 held in place by terminal blocks 2a, the base carrying a cover plate 3 which is provided with an internal boring 4 which contains a helical spring 5 surrounding the operating cord or chain 6, the moving contact operating member 7 and a driving member or pinion 8 composed of insulating material, the latter operating on the moving contact member 9, which is given a step by step uni-directional movement as a result of tension applied to the cord or chain 6, the latter depending downwardly from the switch and carrying at its lower end a suitable knob or other device 10 (see Figure 5) which can be grasped by the fingers.

The cover plate 3 is formed with a tubular extension 11, which extension contains the aforesaid driving member 8, the walls of the tubular extension being formed with two oppositely positioned helical faces 12 of opposite pitch.

The moving contact operating member 7 takes the form of a cup shaped cord sleeve having a pair of diametrically positioned arms 13 which engage the two helical faces, the upper end of the cord being knotted as at 14, the knot being enclosed by the cord sleeve.

To maintain the arms 13 in contact with the helical faces 12 the lower extremity 15 of the spring enters a recess 16 in the tubular extension 11, the upper extremity 17 of the spring engaging one of the arms 13, the tension of the spring thereby maintaining the arms in contact with faces 12.

The driving member 8 which is composed of insulating material is a loose fit within the tubular extension 11 on the cover plate and is prevented from moving endwise therein by a shoulder 18. The walls of this member are formed with two oppositely arranged, diametrally positioned slots 19 in which the two arms 13 on the cord sleeve 7 slide. Consequently endwise movement of the cord sleeve 7 as a result of tension in the cord 6 moves the cord sleeve downwardly along the two helical faces 12 and at the same time imparts a rotational movement to the driving member 8, The driving member 8 is provided at its upper end with a central protuberance 20, which seats in a correspondingly shaped recess 21 in the base 1 and around this projection is disposed the moving contact member 9 which member includes as shown clearly in Figure 9 a pair of arcuate shaped spring arms 22 which are pressed out of the plane of the contact member and are adapted to engage with the two fixed contacts 2 or alternately enter recesses 23 in the bottom of the base in which position the electrical circuit will be broken.

To impart a uni-directional movement to the moving contact member 9 the driving member 8 is formed with four projections 24 on its upper surface separated by recesses 25 of sector shape as shown clearly in Figure 8. These projections 24 engage pressed out ratchet like teeth 26 on the moving contact member, the arrangement being such that each time the driving member 8 is moved angularly as a result of tension in the cord, the driving member as a result of its engagement with the ratchet teeth rotates the moving contact member through an angle sufficient to engage or disengage the arms 22 with the fixed contacts 2.

As previously mentioned, the cord is surrounded by a helically arranged coil spring 5 which coil spring engages one of the radially positioned arms on the moving contact operating member at its upper end. This coil spring is tensioned slightly before assembly and as the opposite end of the spring is located within the tubular extension of the cover the arrangement is such that the spring as a result of it being tensioned tends to move the cord sleeve 7 back to its initial position, the tension in the spring ensuring engagement of the arms with the helically arranged faces. The result is that the projections 24 on the driving member override the inclined ratchet teeth 26 on the moving contact member, thus leaving the moving contact member in the position into which it has previously been moved. On a second pull being applied to the cord, however, the projections 24 will each engage the ratchet teeth 26 to impart a second part rotational movement to the moving contact to break or again complete the electrical circuit. The provision of two oppositely arranged helical faces as distinct from helical grooves reduces friction and ensures easy operation of the switch.

The lower end of the sleeve like part of the cover plate may be externally screw-threaded at 27 at its lower end for the reception of a fixing ring 28 which may serve to hold a rose or other ornamental member in position to enclose the base.

The base is provided with holes 29 for the reception of tubular rivets to secure the cover on the base and for the passage of securing screws whereby it may be attached to the ceiling or other horizontal surface.

By the employment of suitable modified bases and suitably modified driving members it is possible to provide an electric switch of the multi-pole type, the bases being secured together in superimposed relationship, the lowermost base being closed by the cover plate hereinbefore referred to.

In the case of a double pole switch, such as is shown in Figure 5, two such bases 1 will be provided, each containing its own fixed contacts 2 and each containing a movable contact member 9. In this case two driving members 8 and 8a will be employed (see Figures 6 and 7) which are coupled together at their centers, the lowermost driving member 8 being engaged by the moving contact operating member 7 which member takes the form of a cord sleeve as hereinbefore described. Both driving members are composed of electrical insulating material and are formed on their upper surfaces with projections 24 and recesses 25 as in the previously described construction which co-operate with ratchet like teeth 26 on the two moving contact members.

The two driving members are coupled together, driving member 8 having a square extremity 30 adapted to enter a square section socket 31 in member 8a.

In this construction tension on the cord will impart a like uni-directional rotational movement to the two contact members so as to simultaneously engage the two sets of fixed contacts. With such an arrangement a switch can be easily and quickly built up having any desired number of poles.

The two bases are of slightly different internal shape, the lower base being modified to accommodate part 8a but the cover plate 3 is identical in construction to that of the switch previously described. Consequently the only modified parts are 8a, 8 and 1, the remaining parts being common to both constructions of switch.

As applied to a simple switch intended for example for electric bell operation with which only a momentary completion of the electrical circuit is required, the driving member may carry a simple type of pressed metal contact member which as a result of angular movement will engage the two fixed contact members whose extremities are preferably turned up at right angles, the coil spring returning the driving member and moving contact member into its inoperative position on the tension in the cord being released.

The switch as hereinbefore described is of simple construction and of compact dimensions, most of the parts being moulded from a suitable thermo-hardening synthetic resin composition, the switch in the case of the alternate make and break type providing a good snap action make and break as a result of the contact arms on the moving contact member riding up projections formed in the base and finally snapping into or out of engagement with the fixed contact members under the inherent resiliency of the moving contact.

I claim:

1. An electric switch comprising a hollow base, contacts located within said base and fixedly secured to said base, a cover plate carried by said base and having a tubular extension formed with two oppositely positioned helical faces of opposite pitch; a moving contact member mounted for turning movement within said base and engaging with and disengaging from said contacts; an operating member for said moving contact member in the form of a sleeve having a pair of diametrically positioned arms adapted to engage said helical faces in said tubular extension of said cover plate; a driving member interposed between said operating member and said moving contact member and engaging said moving contact member and composed of electrical insulating material and angularly movable within said tubular extension of said cover plate and formed with a pair of diametrically positioned longitudinal slots with which said arms on said operating member engaged to impart a turning movement to said driving member and permit of axial movement of said operating member in relation to said driving member in both directions; a cord extending through said tubular extension of said cover plate and secured to said operating member for moving said arms of said operating member along said helical faces in said tubular extension of said cover plate; and a helical return spring interposed between said operating member and said tubular extension of said cover plate to maintain engagement of said arms of said operating member with said helical faces on said tubular extension of said cover plate and for returning said operating member to its initial position.

2. An electric switch as set forth in claim 1 wherein one end of said helical return spring engages one of said arms of said operating member and its other end engages said tubular extension of said cover plate, said helical return spring being tensioned slightly during the assembly so as to hold said arms in engagement with said helical faces during the movement of said operating member in both directions.

3. An electric switch comprising a first hollow base; contacts located within said first base and fixedly secured to said first base; a first moving contact member mounted for turning movement within said first base and engaging with and disengaging from said contacts on said base; a second base secured to said first base; contacts fixedly secured to said second base; a second moving contact member mounted for turning movement within said second base and engaging with and disengaging from said contacts on said second base; a first driving member turnably mounted in said second base and engaging said first moving contact member; a cover plate secured to said second base and having a tubular extension formed with two oppositely positioned helical faces of opposite pitch; an operating member for said first and second moving contact members in the form of a sleeve having a pair of diametrically positioned arms adapted to engage said helical faces in said tubular extension of said cover plate; a second driving member interposed between said operating member and said second moving contact member and engaging said second moving contact member and coupled to said first driving member and composed of electrical insulating material and angularly movable within said tubular extension of said cover plate and formed with a pair of diametrically positioned longitudinal slots with which said arms on said operating member engage to impart a turning movement to said second driving member and permit of axial movement of said operating member in relation to said second driving member in both directions; a cord extending through said tubular extension of said cover plate and secured to said operating member for moving said arms of said operating member along said helical faces in said tubular extension of said cover plate; and a helical return spring interposed between said operating member and said tubular extension of said cover plate to maintain engagement of said arms of said operating member with said helical faces on said tubular extension of said cover plate and for returning said operating member to its initial position.

4. An electric switch comprising a first hollow base; contacts located within said first base and fixedly secured to said first base; a first moving contact member mounted for turning movement within said first base and engaging with and disengaging from said contacts on said base; a second base secured to said first base; contacts fixedly secured to said second base; a second moving contact member mounted for turning movement within said second base and engaging with and disengaging from said contacts on said second base; a first driving member turnably mounted in said second base and engaging said first moving contact member; a cover plate secured to said second base and having a tubular extension formed with two oppositely positioned helical faces of opposite pitch; an operating member for said first and second moving contact members in the form of a sleeve having a pair of diametrically positioned arms adapted to engage said helical faces in said tubular extension of said cover plate; a second driving member interposed between said operating member and said second moving contact member and engaging said second moving contact member and coupled to said first driving member and composed of electrical insulating material and angularly movable within said tubular extension of said cover plate and formed with a pair of diametrically positioned longitudinal slots with which said arms on said operating member engage to impart a turning movement to said second driving member and permit of axial movement of said operating member in relation to said second driving member in both directions, one driving member having a square projection for entry into a square recess in the adjacent driving member; a cord extending through said tubular extension of said cover plate and secured to said operating member for moving said arms of said operating member along said helical faces in said tubular extension of said cover plate; and a helical return spring interposed between said operating member and said tubular extension of said cover plate to maintain engagement of said arms of said operating member with said helical faces on said tubular extension of said cover plate and for returning said operating member to its initial position.

5. An electric switch comprising, in combination, support means having a tubular extension formed with two oppositely positioned helical faces of opposite pitch; contact means fixedly secured to said support means; a moving contact member mounted for turning movement on said support means and engaging with and disengaging from said contact means; an operating member for said moving contact member having a pair of diametrically positioned arms adapted to engage said helical faces in said tubular extension; a driving member interposed between said operating member and said moving contact member and engaging said moving contact member, said driving member being formed with a pair of diametrically positioned longitudinal slots with which said arms on said operating member engage to impart a turning movement to said driving member and permit of axial movement of said operating member in relation to said driving member in both directions; a cord secured to said operating member for moving said arms of said operating member along said helical faces in said tubular extension of said cover plate; and means engaging said operating member and said tubular extension to maintain engagement of said arms of said operating member with said helical faces on said tubular extension and for returning said operating member to its initial position.

References Cited in the file of this patent
UNITED STATES PATENTS 454,816     Ward _____ June 23, 1891